US012130006B2

(12) United States Patent
Hawkins

(10) Patent No.: US 12,130,006 B2
(45) Date of Patent: Oct. 29, 2024

(54) AUTOMOTIVE WORKPIECE WITH DIRECT AND INDIRECT LIGHTING

(71) Applicant: Lacks Enterprises, Inc., Grand Rapids, MI (US)

(72) Inventor: Thomas Hawkins, Grand Rapids, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 0 days.

(21) Appl. No.: 18/394,007

(22) Filed: Dec. 22, 2023

(65) Prior Publication Data

US 2024/0210010 A1 Jun. 27, 2024

Related U.S. Application Data

(60) Provisional application No. 63/435,010, filed on Dec. 23, 2022.

(51) Int. Cl.
*F21V 7/00* (2006.01)
*F21W 104/00* (2018.01)
*F21Y 113/00* (2016.01)

(52) U.S. Cl.
CPC ....... *F21V 7/0008* (2013.01); *F21W 2104/00* (2018.01); *F21Y 2113/00* (2013.01)

(58) Field of Classification Search
CPC .............. F21V 7/0008; F21W 2104/00; F21Y 2113/00
See application file for complete search history.

(56) References Cited

U.S. PATENT DOCUMENTS

| | | | | |
|---|---|---|---|---|
| 7,597,935 | B2 | 10/2009 | Xu et al. | |
| 10,137,825 | B1 * | 11/2018 | Salter | F21S 45/47 |
| 10,988,094 | B2 | 4/2021 | Walters et al. | |
| 11,795,563 | B2 | 10/2023 | LaVallee et al. | |
| 2010/0182143 | A1 * | 7/2010 | Lynam | B60R 1/1207 340/465 |
| 2016/0333483 | A1 | 11/2016 | LaVallee | |
| 2019/0389412 | A1 * | 12/2019 | Walters | F21S 43/50 |
| 2022/0113455 | A1 * | 4/2022 | Hawkins | B60R 13/00 |

* cited by examiner

*Primary Examiner* — Leah Simone Macchiarolo
(74) *Attorney, Agent, or Firm* — Dickinson Wright PLLC

(57) ABSTRACT

A decorative automotive component includes a structure having a textured surface with a plurality of light-reflecting facets. The textured surface is selectively metallized, such as via electroplating, such that a plurality of openings are defined through the metal material and which expose the underlying substrate. A first light source, hidden from view, is disposed above the textured surface and directs light onto the reflective textured surface, such that light is reflected outwardly therefrom. A second light source is disposed within the structure and below the substrate, and directs light through substrate and directly into and through openings, such that the openings are illuminated and visible. The light sources can be activated individually or at the same time to combine the lighting effect.

20 Claims, 3 Drawing Sheets

AUTOMOTIVE WORKPIECE WITH DIRECT AND INDIRECT LIGHTING

CROSS-REFERENCE TO RELATED APPLICATIONS

The present application claims the benefit of U.S. Provisional Patent Application No. 63/435,010, filed Dec. 23, 2022, the entire content of which is incorporated by reference in its entirety.

FIELD

The present application is directed to automotive vehicle components, in particular decorative components having plated finishes.

BACKGROUND

Plated decorative chrome finishes have been commercially available for various products in the automotive, appliance, consumer electronics, and other markets for many years. As technologies and consumer tastes have matured, the desire for more complicated parts and designs has evolved. It has become more desirable to incorporate multiple functions into a single component as a manner of adding an aesthetic quality with fewer manufacturing steps. This trend has been exemplified in the way lighting has been incorporated and integrated into decorative chrome plated injection molded parts for the automotive industry.

Applicant's previous disclosures describe how light can be transmitted through a plated plastic workpiece or how to use textured surfaces to redirect light from a hidden source towards a viewer.

One example of a light emitting finish through a plastic workpiece is disclosed in Applicant's U.S. Pat. No. 11,795,563, issued Oct. 24, 2023, incorporated by reference herein in its entirety, which describes the provision of a light emitting finish through a plated plastic workpiece. A plateable body portion includes an electroplated layer of material disposed over a translucent and light-transmissive body portion. The electroplated layer has a bare section, through which the light will project.

Various patterns and shapes may be provided for the bare section through which the light will project. The pattern or creation of the bare section may be created through the use of laser ablation to remove plated material, or to remove an underlying plateable prior to adhering the finish layer thereon.

One example of using textured surfaces to redirect light towards a user is described in Applicant's U.S. Pat. No. 10,988,094, issued Apr. 27, 2021, incorporated herein by reference in its entirety. A vehicle trim component, such as a vehicle grill, includes a substrate with a plurality of facets formed on the surface of the substrate and defining a disrupted reflective surface. The facets include characteristics such that they are configured to reflect an incident light beam in a common direction toward a target. A reflective coating may be applied over the disrupted reflective surface.

In view of increasing changes to consumer demand, improvements can be made to the provision of decorative workpieces having lighted features.

SUMMARY

Each of the above disclosures shows how light can be used to integrate with a decorative metallized part in different ways. However, the idea that these approaches can be combined is novel and unique.

It is an aspect of the disclosure to provide both direct and indirect lighting to a decorative component for an automotive vehicle.

In one aspect, a decorative component for an automotive vehicle includes: a first structure having a visible surface and a non-visible surface; a second structure adjacent the first structure and having a visible surface and a non-visible surface; a textured surface disposed on the visible surface of the second structure; a reflective metal surface of metal material applied to at least a portion of the textured surface; a first light source disposed in the first structure and oriented to project light toward the textured surface of the second structure; a plurality of openings defined in the reflective metal surface, wherein the plurality of openings expose an underlying substrate of the second structure and do not include the metal material; a second light source disposed within the second structure and oriented to project light directly onto the non-visible surface and through the openings to the visible surface of the second structure; wherein, when both the first and second light sources are activated, light projected by the first light source onto the textured surface and reflected therefrom combines with light projected directly through the plurality of openings to define a combined lighting scheme for the visible surface of the second structure.

In one aspect, the first structure includes a concealed surface, wherein the first light source is disposed above the concealed surface and is not directly visible from above the first structure.

In one aspect, the concealed surface includes at least one aperture through which light from the first light source projects toward the textured surface of the second structure.

In one aspect, the second structure is disposed below the first structure.

In one aspect, the second light source is disposed below the substrate and projects light upward toward the substrate.

In one aspect, the first and second light sources are individually activatable, wherein, when the first light source is activated, light from the first light source is reflected by the textured outwardly from the metal surface toward a target, and wherein, when the second light source is activated, light is projected directly from the plurality of openings in the metal surface.

In one aspect, the first and second structures are integrally formed as part of the same substrate.

In one aspect, the plurality of openings are arranged in a gradient pattern.

In one aspect, the second structure includes a plurality of facets that define the textured surface, wherein the facets reflect light from the first light source transverse to the first light source and outwardly from the metal surface.

In one aspect, the facets are formed on a curved portion of the substrate, wherein the curved portion is convex facing the visible direction.

In one aspect, the first structure also includes a reflective metallized textured surface on the visible surface thereof and reflects light from an additional light source.

In one aspect, the first structure also includes a second light source therein directed toward a plurality of openings formed in the reflective metallized textured surface of the first structure.

In one aspect, the metal surface is electroplated and the second structure is formed from a plateable substrate.

In one aspect, the plateable substrate is transparent or translucent and light-transmissive.

In one aspect, the visible surface of the second structure is electroplated and the non-visible surface is unplated and free from metal material.

In one aspect, light from the first light source is projected generally downwardly and vertically and is reflected by facets of the textured surface in a direction generally horizontally therefrom.

In another aspect, a method of illuminating a decorative automotive component is provided, the method including: activating a first light and projecting light toward a structure having visible selectively metallized surface and a non-visible surface, wherein the metallized surface is textured having a plurality of facets and further includes a plurality of openings therethrough that expose an underlying substrate; and activating a second light source and projecting light directly into the substrate and through the plurality of openings; wherein light from the both the first light source and the second light source is outwardly visible on the structure.

In one aspect, the first and second light sources are individually activatable and when activated at the same time define a combined lighting scheme on the structure.

In one aspect, the first light source is hidden within an adjacent structure above the structure.

In one aspect, the second light source is hidden within the structure below the substrate and the textured surface.

DETAILED DESCRIPTION

Figure 1:
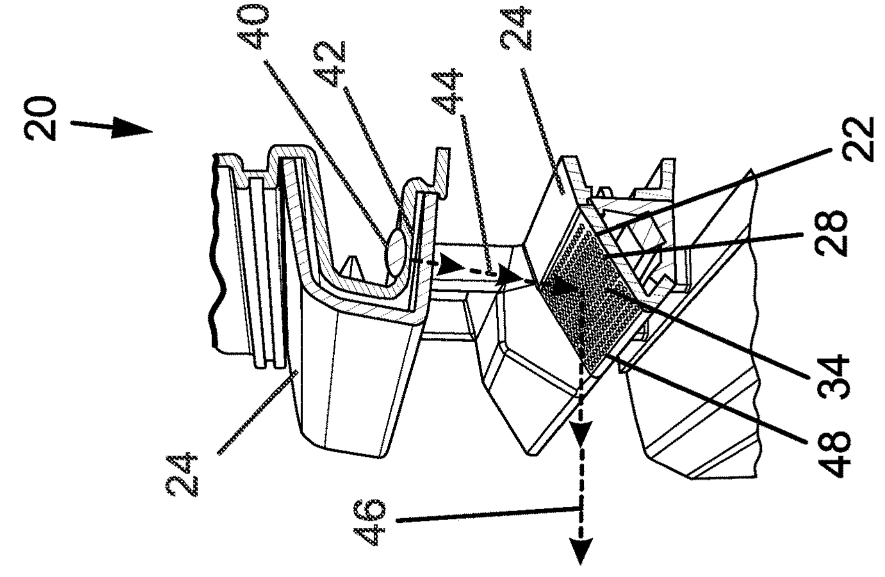
FIG. 1 is a perspective view of indirect light being provided to a feature of a decorative automotive component for reflection toward a target according to aspect of the disclosure.
Figure 2:
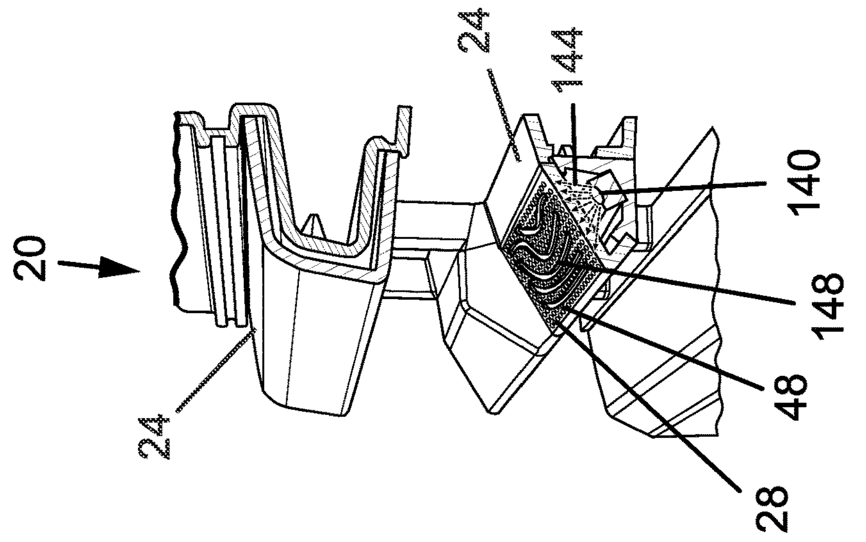
FIG. 2 is a perspective view of direct light being provided to a feature of a decorative automotive component for illumination according to aspect of the disclosure.
Figure 3:
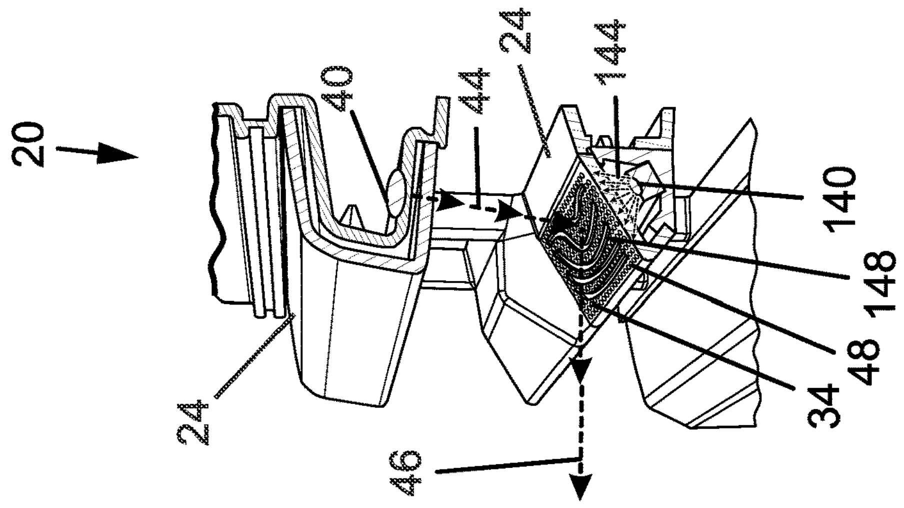
FIG. 3 is a perspective of both direct and indirect light being provided to a feature of a decorative automotive component for both reflection and illumination according to an aspect of the disclosure.

With reference to FIGS. 1-3, images depicting indirect lighting, direct lighting, and combinations of indirect and direct lighting are shown. As shown, a consumer trim component 20 is provided. As shown, the trim component 20 may be in the form of a decorative exterior component for a vehicle, such as a grille of a vehicle. However, it will be appreciated that the subject trim component 20 may be used in a vehicle interior or for other non-vehicle applications, such as household devices and/or building construction materials. For the purposes of discussion and illustration, the vehicle trim component in the form of a grille will be described.

FIG. 1 illustrates indirect reflective lighting provided on a feature of the time component 20 in the form of a grille. In this arrangement, the light is provided from above the grille component, where the incident light impacts the surface features formed on the reflective surface, and is directed outwardly toward a target. In the case of a vehicle grille, the light may be reflected toward an observer standing in front of the vehicle for example. This surface may therefore appear illuminated based on the reflected light. The light source is hidden behind another feature of the grille and is typically nor visible to the observer. While only one light source is illustrated and one reflective surface is illustrated, it will be appreciated that a variety of light sources and reflected surfaces can be similarly arranged on the time component 20, to be directed toward the same target or other targets.

FIG. 2 illustrates direct lighting being provided to a vehicle feature similar to FIG. 1. In FIG. 3, the light source is shown below and/or behind the visible vehicle feature. The feature includes bare portions formed in the surface finish of the visible feature. The surface finish is disposed on a translucent material, such that the light projected from behind the translucent material will transmit through the material and be visible through the bare portions. The bare sections are illustrated as a plurality of wavy lines for illustrative purposes, but these bare sections may be sized or shaped as desired to define various shapes, text, symbols, logos, or the like.

FIG. 3 illustrates multiple light sources and multiple forms of illumination. The indirect lighting from above the feature is reflected by the facets formed in the surface of the feature, which includes a surface finish, and bare sections within the finish also are illuminated by the light source behind the underlying translucent substrate. Thus, both the indirect reflective light and the direct illumination are provided by the trim component 20 illustrated in FIG. 3.

Figure 4:
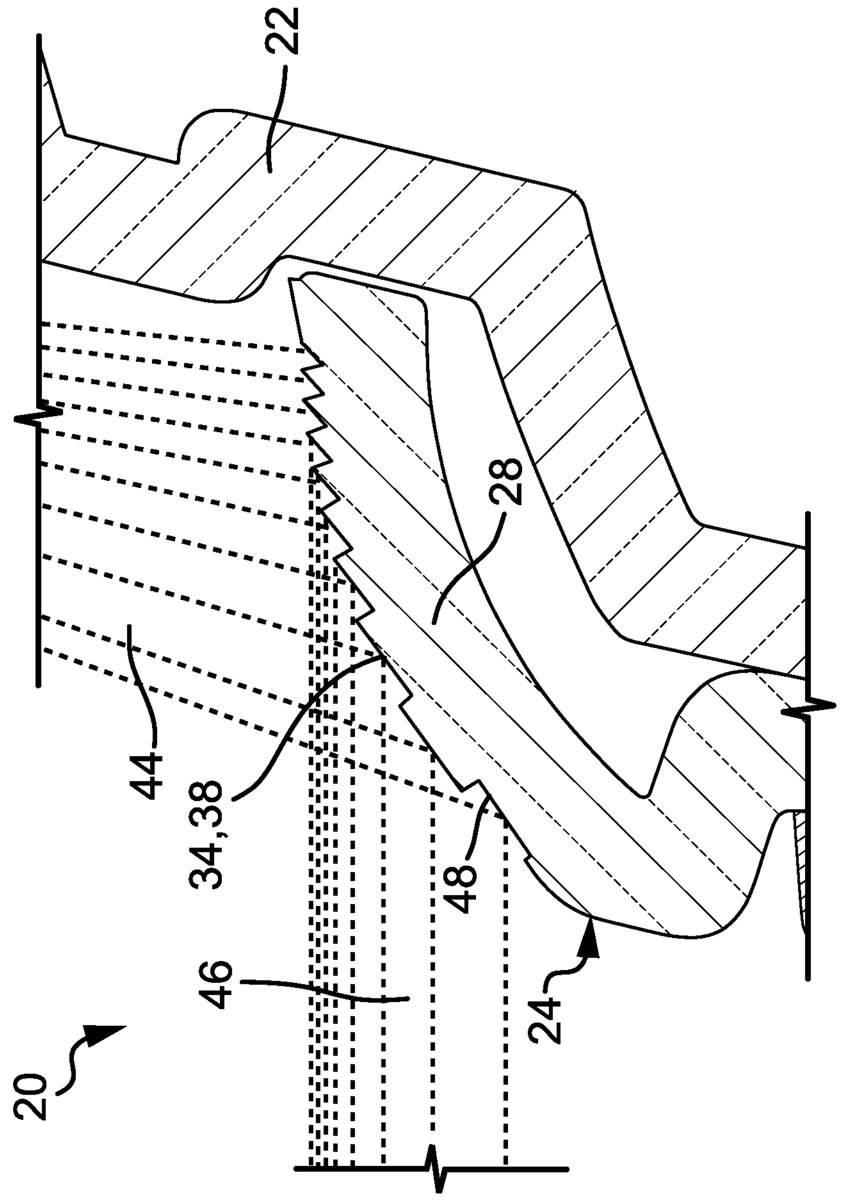
FIG. 4 is a cross-sectional view of the feature of the automotive component reflecting indirect light.

FIG. 4 provides additional detail regarding the reflective surface. The trim component 20 may include a substrate 22 having a 3-dimensional shape and defining a disrupted reflective surface 34 including a plurality of facets 38 over a surface 28. In some embodiments, the surface 28 may be a curved surface (as shown), such as a convex, concave, or a complex curve (being both convex and concave in sections). In other embodiments, the disrupted reflective surface 34 may be flat or generally flat (such as a sloped surface, vertical surface, horizontal surface, or the like). In one aspect, the facets 38 may be integrally formed in the substrate 22 and may be formed by the molding of the substrate 22. In another aspect, the facets 38 may be formed and/or added onto the surface after molding.

Each of the facets 38 is configured to maximize reflection of an incident light beam 44 in a common direction, for example, toward a given target. As shown, the light beam is provided from the top of FIG. 4, down toward the facets 38, which is reflected out toward the left toward a target. A reflective coating 48, such as a metal or chrome plating layer, overlies the disrupted reflective surface 34. The coating 48 may be applied to a surface already having the facets 38 formed thereon, with the coating applied thereon resulting in a corresponding faceted and disrupted reflective surface.

The reflective coating 48 may be an electroplated chrome, although other types of reflective coatings 48 may be used such as a Physical Vapor Deposition (PVD) coating, a hot-stamp film, or an insert-molded film. The substrate 22 may be made of a material that includes one or more of Acrylonitrile Butadiene Styrene (ABS), a blend of Polycarbonate with ABS (PC-ABS), a blend of ABS with Polycarbonate (ABS-PC), Polyamide, and/or Aramid. In some embodiments, the substrate 22 may be injection molded. In one aspect, the substrate material may be an acrylic material.

According to another aspect of the disclosure, the facets 38 may be irregular, with each of the facets 38 having an orientation direction that is dependent on a desired diffusion of light reflected therefrom and on the orientation of a curvature of the curved surface 28 thereunder. For example, the facets 38 may be progressively tilted by different degrees, such that each of the facets 38 is oriented to provide the maximum directional reflection toward a given target of light from a predetermined source. The facets 38 may also be configured to minimize reflection from directions or sources that are not the predetermined source. The facets 38 may have similar shapes and/or be arranged in a repeating pattern, but with one or more irregular features. According to an aspect of the disclosure, the facets 38 may be irregular, with sizes varying in a size gradient based on the curvature of the curved surface 28. For example, the facets 38 may progressively vary from smallest to largest or from largest to smallest. As shown in FIG. 4, the facets 38 progress generally from smallest to largest from the top to the bottom of curved surface 28. It is also apparent from FIG. 4 that the angle of the facet surface, relative to a given plane, varies in the top to bottom direction (for example being more vertical near the top than at the bottom).

It will be appreciated that the automotive grill feature illustrated in FIG. 4 is one example of a trim component and shape, and that other components or shapes may be provided having similar features and/or benefits of the present disclosure. For instance, aspects of the present disclosure may be applicable to other vehicle structure such as roof rails, bumpers, mirror casings, internal trim components, and the like.

With reference again to FIGS. 1-3, FIG. 1 depicts how light from a hidden source can be directed onto textured surface 34 that is engineered to have facets 38 that will reflect the light beams 44 (provided by a light source above as shown in FIG. 1, although the light source may be disposed at other locations relative to other reflective surfaces and/or orientations) towards a viewer in the horizontal direction. The facets 38 on the textured surface 34 are engineered to reflect light in the desired direction based on the curvature of the part 22, the angle of the facets 38, and the orientation of the light beams 44 in relation to the illuminated area. The redirected light 46, from the textured surface 34 toward the target, gives the viewer the impression that the reflecting surface 34 is lit up or illuminated, without disclosing to the viewer where the light source is actually located. Indeed, in the above example, the light source is above the surface and hidden behind the structure of an adjacent section of the trim component 20, and is not generally visible to the viewer under normal conditions.

As shown in FIGS. 1, 3, and 4, according to another aspect of the disclosure, the trim component 20 includes a light source 40 configured to illuminate the disrupted reflective surface 34. The light source 40 may include, for example, one or more LEDs, incandescent lights, lasers, or other devices capable of producing visible light. As shown in FIGS. 1, 3, and 4, the light source 40 may produce and direct an incident light beam 44 upon the disrupted reflective surface 34, which reflects therefrom as a reflected light beam 46 in a direction toward a target or viewer. In the case of a vehicle grille, the reflected light beam 46 is directed toward an area in front of the grille.

In some embodiments, the light source 40 may be a diffuse light source, producing the incident light beam 44 which spreads out over a relative wide area of the disrupted reflective surface 34. Alternatively, the light source 40 may be a focused light source, producing the incident light beam 44 which does not spread out over a wide area of the disrupted reflective surface 34, and which is directed to a relative narrow area of the disrupted reflective surface 34. The area over which the incident light beam 44 is projected (whether narrow or broad) will generally correspond to the amount of area that appears illuminated to the viewer at the target area. In one aspect, the light source 40 may include one or more optical elements such as lenses and/or diffusers to distribute light across the disrupted reflective surface 34 or to focus light upon a specific area of the disrupted reflective surface 34, as desired.

The light source 40 may produce light having a single, predetermined color, such as white. Alternatively, the light source 40 may produce several different colors of light at the same time and/or at different times. In some embodiments, the light source 40 may be configured to vary in intensity and/or color over time according to a sequence. For example, the light source 40 may cycle through different colors and/or different intensities over a period of time that is sufficiently long enough for a viewer to perceive the different intensity and/or colors being produced. The sequence or cycle may include two or more different colors. In some embodiments, multi-color effects may be produced with different regions of the disrupted reflective surface 34 having different colors at the same time and/or at different times. In one example, the light source 40 may generate a multi-color light pattern upon the disrupted reflective surface 34, with each of the different colors being visible simultaneously, and with different colored portions of the disrupted reflective surface 34 varying in color, location, and/or intensity over time. For example, at a first time, a first color, such as blue, may be directed to the reflective surface 34, such that the illumination effect on the surface 34 appears blue, and at a second time a second color, such as red, may be directed to the reflective surface. In another example, blue light may be directed toward a first portion of the surface 34 and red light may be directed to another portion of the surface 34, such that both blue and red appearances result.

The facets 38 could be configured as sweeping planes across the curved surface 28 to maximize the reflected light to the target. An example of such an arrangement is shown in the cross-section of FIG. 4. The direction of each facet 38 may be dependent on the level of diffusion desired for the reflected light beam 46 and the curvature of the curved surface 28. The design and orientation of the facets 38 may be mathematically determined during the design stage, with the specific facet design being unique to the individual component 20. The facets 38 may be formed together with the rest of the substrate, for example by molding or casting the substrate. The facets 38 can also be made reflective by a number of techniques, as discussed above, including the use of metal or chrome plating onto the substrate.

In some embodiments, and as shown in FIGS. 1-3, the trim component 20 may have a 3-dimensional shape including a plurality of structures 24, shown in FIGS. 1-3 extending outwardly (such as the features of a vehicle grille). Thus, the structures 24 may be referred to as protruding structures, but it will be appreciated that other arrangements of the structures may also be used that are not necessarily protruding while still keeping within the spirit and scope of the present disclosure. For example, in one approach, recesses may be formed in a component face to form the structures 24. The structures 24 may include the curved surfaces 28 thereon. Alternatively or additionally, light sources 40 may be disposed within the structures 24. For example, as shown in the cross-section of FIGS. 1 and 3, the light sources 40 may project the incident light beam 44 out from an aperture 42 in the bottom surface of the illustrated structures 24 of the trim component 20. In some embodiments, the trim component 20 may include a plurality of apertures 42, which may be aligned in an array, or the aperture 42 may be arranged a single aperture 42 shaped as a long, thin strip. FIGS. 1 and 3 include lines representing incident light beams 44 from one of the light sources 40, for simplicity of the drawings. However, incident light 44 may project from any or all of the light sources 40 disposed in the component 20 at any given time. In one aspect, a plurality of separate light sources 40 may be disposed along the length of the structure 24, or one or more strips of lights or LEDs may be arranged along the structure 24.

In some embodiments, the light source 40 may be configured to be directly visible to a viewer. In other embodiments, including that shown in FIGS. 1 and 3, the light source 40 may be configured to not be directly visible to a viewer. For example, and as shown in FIGS. 1 and 3, the light source 40 may be located on or within a concealed surface at the underside of an overhanging portion of one of the structures 24 of the trim component 20. In some embodiments, light source 40 may be recessed within the substrate 22 and configured to project the incident light beam 44 out through the concealed surface of the trim component 20. More specifically, and as shown in FIGS. 1 and 3, one or more of the concealed surfaces may define the apertures 42 for projecting light from the light sources 40 that are recessed within the structures 24 of the trim component 20. Thus, direct light from the light source 40 may be not directly visible to a viewer, making the reflected light beam 46 stand out and providing a visually appealing effect.

Although the light source 40 may be visible when looking up from below, the light source 40 would not be visible from a perspective of an intended viewer, who may be located directly in front of or at an elevated position relative to the trim component 20. Therefore, lighting provided by the light source 40 may enhance the look of the reflective trim component 20, increasing visibility while reducing back reflection from other sources. Other configurations or devices, such as shrouding, may be used to further limit, block, or prevent the light source 40 from being directly visible to the viewer.

FIGS. 2 and 3 illustrates a further aspect of the disclosure, showing how direct light 144 from a housing can be directed through a translucent or transparent plastic substrate 22 having curved surface 28. The surface 28 may include the same type of textured surface 34 as in FIG. 1. However, with light source 40 not being present and/or activated in FIG. 2, the incident light 44 is not projected or directed onto the surface 28. Accordingly, in FIG. 2, the surface 28 may also be formed without a substantial texture. In FIG. 3, both direct and indirect light are provided, and the surface 28 therefore includes a textured surface 34 according to the aspects of FIGS. 1 and 4. However, for discussion and illustrative purposes, the surface 28 of FIG. 2 includes the textured surface 34.

The reflective metal layer 48 over the outer surface or curved surface 28 of plastic substrate 22 is selectively metallized to produce small openings 148 in the metal layer 48 (or larger areas/shapes/logos or varying sizes/distributions of openings if desired) that contain no metal. Further details of selective metallization can be found in U.S. Pat. No. 11,795,563, referenced above previously and incorporated by reference. These open, non-metallized openings/areas 148 allow light to pass through the translucent or transparent material of the substrate 22. The small openings 148 can be arranged in various configurations and sizes to depict an image or graphic. Alternatively, larger open areas can be shaped in the form of an icon or recognized shape. Different methods of removing or blocking a finish layer in certain areas, to expose the translucent material, may be used to create the various bare areas, depending on the specific area and/or as desired.

As shown in FIGS. 2 and 3, light source 140 is shown disposed inside structure 24. Light 144 from light source 144 is projected upward onto the underside of the surface 28, which is not metallized or otherwise light-blocking. The light 144 is therefore transmitted into and through the translucent or transparent material of the structure 24. The openings or holes 148 that are not metallized are thereby directly illuminated, while the metallized portion 48 surrounding the opening blocks light and is not illuminated. FIG. 2 illustrates the directly illuminated openings 148 as a series of wavy lines, but it will be appreciated that other patterns may be used, including various arrays or arrangement of dots or the like, with varying density, or different shapes or logos.

FIG. 3, like 2, illustrates direct light through the openings 148, in addition to the reflected light from textured surface 34 as described above with reference to FIG. 1. Thus, in the example of FIG. 3, both direct and indirect lighting can be provided at the same area of the trim component structure. The light source 40 and/or 140 can be selectively controlled to provide different lighting effects. Different colors or sequences can be used for both light sources 40 and 140 to provide different colors or sequences, and the selection of either direct or indirect lighting, or the combination thereof, can be used to provide the desired illumination appearance.

In both cases, the light source itself is not typically visible to the user. In the absence of illumination, the trim component 20 may appear as a traditional trim component that lacks illumination, and the illumination effect can be activated as desired by the user or via a predetermined vehicle program. For example, the illumination features may be activated in response to locking or unlocking the vehicle, starting the vehicle, approaching the vehicle, when the vehicle exceeds a certain speed or performs a certain maneuver, or the like.

Figure 6:
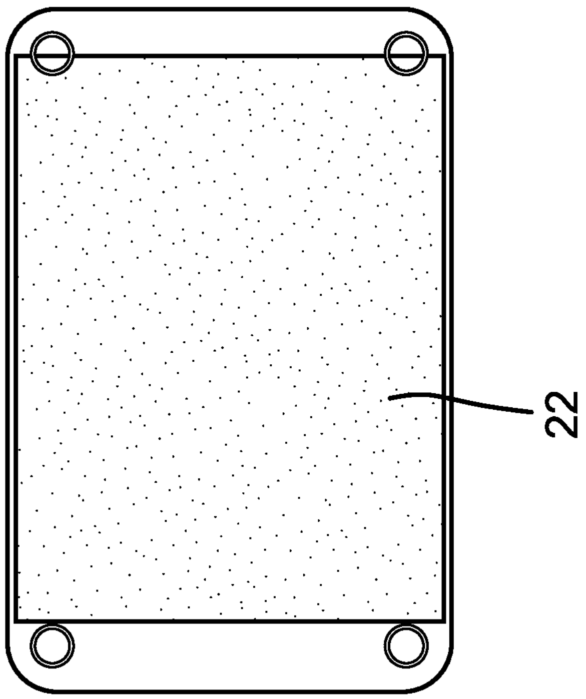
FIG. 6 is a back view of the component of FIG. 5 illustrating no plating.
Figure 5:
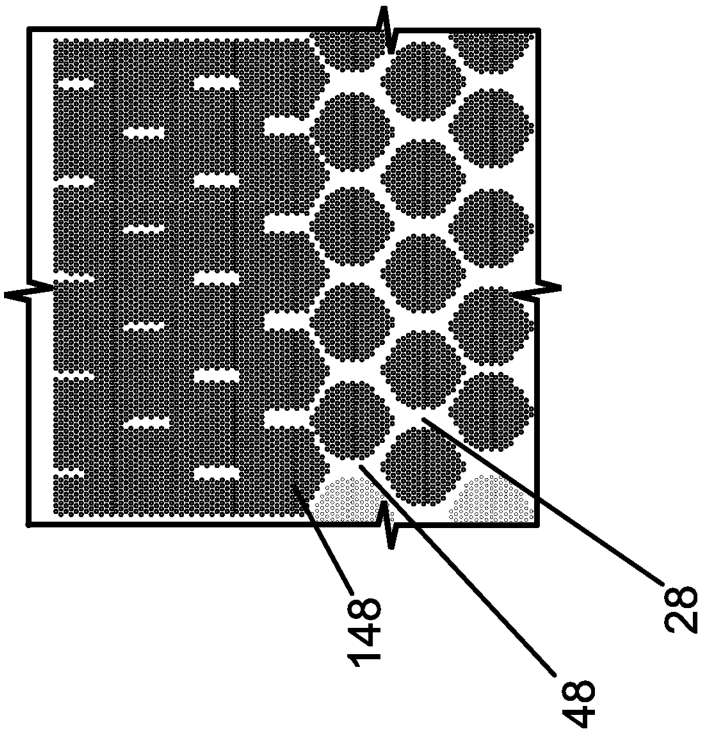
FIG. 5 is a front view of a feature of the automotive component illustrating selective metal plating with direct lighting.

With further reference to the direct illumination aspect, FIG. 5 illustrates one example of a selectively metallized surface, showing various sizes and arrangements of the openings 148, illustrating a gradient pattern. FIG. 6 illustrates the backside or underside of the example of FIG. 5, showing substantially no metallization, such that the light from a light source like light source 144 is fully or substantially received by the large bare area of the translucent or transparent substrate, and transmitted through the material of the substrate 22 to illuminate through the openings 148 disposed across the opposite side of the substrate and providing the illuminated pattern or image according to the arrangement of the openings 148. The illustrated gradient pattern is one example illustration, but it will be appreciated that variations or the locations, density, size, etc. of the openings 148 may be selected to create the desired graphical image.

FIG. 3, as discussed above, illustrates a combination of the aspects of both FIGS. 1 and 2, with both light source 40 and light source 140 being activated in the illustration of FIG. 3. Accordingly, light beams 44 and 144 are both provided, and reflected light 46 results from the textured surface 34 in addition to the direct illumination of the openings 148. Accordingly, a different overall illumination is provided that is not possible by using just one of the illumination schemes. Of course, as discussed above, the different light sources 40 and 144 may be controlled to provide one or more types of the illumination as desired according to user preference or predetermined control schemes, and that both lights 40 and 140 do not necessarily need to be illuminated at the same time Thus, according to an aspect of the disclosure, a preferred embodiment of includes a translucent injection molded plastic body or substrate 22 that is electroplateable. Typically, the component 20 will be subjected to a decorative chrome plating process of a type known in the art. The component 20 is designed to incorporate light source or sources 40, 140 behind the visible surface of the component 20, for instance as shown in the illustrated examples and described above. The component 20 may be plated as previously described to obtain a selectively metallized surface 48 having the plurality of openings 148. The surface on the backside of the component 20 (or structural potion 24 thereof) is not metallized or includes a substantially large bare area, thereby allowing for light to transmit from light source 144 through the plastic body of the part.

It is also possible that, in another aspect of the disclosure, the component 20 could be constructed of a clear transmissive, or translucent resin that is subsequently metallized through physical vapor deposition (rather than electroplating) and then subjected to laser ablation in order to achieve the selective metallization. In such a case it may be preferable to metallize the interior part of the housing (rather than the outer facing surface) in order to protect the metal finish on the part especially when used in exterior applications on a vehicle. In one aspect, it may be preferable to cover the exterior of the thin metal coating from physical vapor deposition with a clear protective coating. In the case where the metal is on the interior the coating may be applied directly to the exposed plastic substrate to prevent scratching or marring and yellowing from UV radiation. If the vapor coating were on the exterior, the coating can be used to prevent the thin metal layer from being chipped or eroded away.

With reference once again to the textured surface 34 of the present disclosure, for example shown in FIG. 4 and incorporated in the surfaces of FIGS. 1-3, the textured facets 38 may be metallized in order to be reflective. It is preferable for this metallization to be done by electroplating, because electroplating has been demonstrated to be the most robust method for obtaining large reflective surfaces at favorable cost and acceptable performance.

However, it is also possible for the texture to be obtained from a plastic injection molding process that is subsequently made reflective by coating either interior or exterior surfaces with a metal layer from a vapor deposition process. A protective coating is then applied on the outer surface for exterior automotive applications. This vapor deposition aspect has limitations relative to the electroplated version, however, because the organic protective coating may cause some disruption of the facets 38 on the microtextured surface 34 that will redirect some of the light 44 in undesired ways, because the coating may not achieve uniform thickness. The uncured coating or paint will, in some instances, pool in the recesses before curing, thereby developing a thicker portion at the bottom of the textured facets and a thinner portion at the peaks of the textured features.

It will be appreciated that the aspects of the present disclosure may be used with various types of plating, textures, and the like. For example, embodiments may include metal finishes that are bright, or satin, or a mixture of the two (see US20160333483, filed May 14, 2015 and published Nov. 17, 2016, which is incorporated by reference in its entirety herein). Embodiments of the present disclosure can include various textured areas for indirect (reflected) light with different microtextured structures. The protective coatings that have been previously described can be colored or clear. Furthermore, the metallized surfaces can also be painted with translucent coatings (see U.S. Pat. No. 7,597,935, filed May 6, 2002 and issued Oct. 6, 2009, incorporated by reference in its entirety herein) that are either clear or tinted.

Lighting can be provided with multiple light sources or a single source depending on the application. Any type of light source can be used including but not limited to incandescent, LED, etc. The color of the lights can be the same or different, white or colored. LED light sources may be employed so that the light color can change and be synchronized with other light sources to show animation through programming. Accordingly, the component may include appropriate wiring and/or connections to a corresponding controller for controlling and/or varying the activation of the lights.

Furthermore, reflected light off microtextured structures and transmissive direct lighting areas can be used on separate portions or section of the same component 20. For example, some sections may include only the textured surface 34 but no openings 148 or embedded light source 144. Some other sections may include the openings 148, but no textured surface 34. Some sections may include the textured surface 34 and the openings 148, but may not include the corresponding light 40/140. Some sections may include both types of light sources 40 and 140, textured surface 34, and openings 148.

In one aspect, the upper structure 24 that has the light source 40 may have the same type of selectively metallized textured surface and may itself receive incident light from an upper adjacent light source, and may also include an internal light source that projects light upwardly into openings defined by the selectively metallized textured surface. For example, multiple structures 24 may be arranged above and below each other (as in a grille structure) and provide both types of lighting aspects above and below to adjacent structures 24.

The upper and lower structures 24 may be part of the same integral substrate, or they may be separate components that are assembled together with each other or onto another base structure. The upper structure 24 may also be plated, or may be non-plated, depending on design desires. The upper structure 24 may include a cap or cover that is applied over the structure, while maintaining apertures or windows for the light to be projected downwardly from the light source 40. The cap or over may itself be plated and/or may include a textured surface to provide reflected light from an adjacent structure that is directed toward the cap or cover.

It will be appreciated that various other aspects may be used in combination with the above disclosure, and that the embodiments described herein are illustrative of the various aspects of the disclosure, and that the aspects of the invention defined by the following claims are not to be limited to the illustrative embodiments.

What is claimed is:

1. A decorative component for an automotive vehicle, comprising:

a first structure having a visible surface and a non-visible surface;

a second structure adjacent the first structure and having a visible surface and a non-visible surface;

a textured surface disposed on the visible surface of the second structure;

a reflective metal surface of metal material applied to at least a portion of the textured surface;

a first light source disposed in the first structure and oriented to project light toward the textured surface of the second structure;

a plurality of openings defined in the reflective metal surface, wherein the plurality of openings expose an underlying substrate of the second structure and do not include the metal material;

a second light source disposed within the second structure and oriented to project light directly onto the non-visible surface, through the underlying substrate, and through the openings to the visible surface of the second structure;

wherein, when both the first and second light sources are activated, light projected by the first light source onto the textured surface and reflected therefrom combines with light projected directly through the plurality of openings to define a combined lighting scheme for the visible surface of the second structure.

2. The decorative component of claim 1, wherein the first structure includes a concealed surface, wherein the first light source is disposed above the concealed surface and is not directly visible from above the first structure.

3. The decorative component of claim 2, wherein the concealed surface includes at least one aperture through which light from the first light source projects toward the textured surface of the second structure.

4. The decorative component of claim 3, wherein the second structure is disposed below the first structure.

5. The decorative component of claim 4, wherein the second light source is disposed below the substrate and projects light upward toward the substrate.

6. The decorative component of claim 1, wherein the first and second light sources are individually activatable, wherein, when the first light source is activated, light from the first light source is reflected by the textured outwardly from the metal surface toward a target, and wherein, when the second light source is activated, light is projected directly from the plurality of openings in the metal surface.

7. The decorative component of claim 1, wherein the first and second structures are integrally formed as part of the same substrate.

8. The decorative component of claim 1, wherein the plurality of openings are arranged in a gradient pattern.

9. The decorative component of claim 1, wherein the second structure includes a plurality of facets that define the textured surface, wherein the facets reflect light from the first light source transverse to the first light source and outwardly from the metal surface.

10. The decorative component of claim 9, wherein the facets are formed on a curved portion of the substrate, wherein the curved portion is convex facing the visible direction.

11. The decorative component of claim 1, wherein the first structure also includes a reflective metallized textured surface on the visible surface thereof and reflects light from an additional light source.

12. The decorative component of claim 11, wherein the first structure also includes a second light source therein directed toward a plurality of openings formed in the reflective metallized textured surface of the first structure.

13. The decorative component of claim 1, wherein the metal surface is electroplated and the second structure is formed from a plateable substrate.

14. The decorative component of claim 13, wherein the plateable substrate is transparent or translucent and light-transmissive.

15. The decorative component of claim 1, wherein the visible surface of the second structure is electroplated and the non-visible surface is unplated and free from metal material.

16. The decorative component of claim 1, wherein light from the first light source is projected generally downwardly and vertically and is reflected by facets of the textured surface in a direction generally horizontally therefrom.

17. A method of illuminating a decorative automotive component, the method comprising the steps of:

activating a first light and projecting light toward a structure having visible selectively metallized surface and a non-visible surface, wherein the metallized surface is textured having a plurality of facets and further includes a plurality of openings therethrough that expose an underlying substrate; and activating a second light source and projecting light directly into the substrate and through the plurality of openings;

wherein light from the both the first light source and the second light source is outwardly visible on the structure.

18. The method of claim 17, wherein the first and second light sources are individually activatable and when activated at the same time define a combined lighting scheme on the structure.

19. The method of claim 17, wherein the first light source is hidden within an adjacent structure above the structure.

20. The method of claim 19, wherein the second light source is hidden within the structure below the substrate and the textured surface.

* * * * *